3,036,011
MASS TRANSFER INHIBITOR FOR LIQUID METAL HEAT TRANSFER SYSTEM

William E. Miller, Ann Arbor, Mich., assignor to Chrysler Corporation, Highland Park, Mich., a corporation of Delaware
No Drawing. Filed Mar. 21, 1957, Ser. No. 647,493
14 Claims. (Cl. 252—71)

This invention relates to corrosion and the like inhibitors for heavy liquid metal heat transfer systems to prevent supersaturation and crystallization therein, and especially to the use of molybdenum powder as a means of retarding mass transfer in a liquid lead and/or bismuth heat transfer system.

It is known that in a closed heat transport system employed in connection with atomic reactors (for instance as described in a paper, entitled "Liquid Metal Fuel Reactor Systems for Power," published by the American Institute of Chemical Engineers in the Chemical Engineering Progress Symposium Series, vol. 50, No. 11, 1954, pp. 245–252), a temperature difference must exist in order to obtain heat for power conversion. If the container material is soluble in the working fluid, then a solubility gradient is set up in the closed system due to the temperature gradient. For example, in a liquid lead and/or bismuth heat transfer system the equilibrium solubility of the commonly employed container materials, for example iron or steel or other ferrous metal is an exponential function of the absolute temperature. This solubility gradient is responsible for supersaturation and crystallization of the ferrous container materials in the cooler parts or sections of the overall heat transfer system and results in corrosion and clogging. At elevated temperature these heavy liquid metals and alloys of these with others are particularly effective in promoting such mass transfer attack.

The problem may be more readily understood by considering the action upon an iron atom forming part of the container wall in the hot zone of a typical liquid metal heat transfer system. Such an atom of iron dissolves in the laminar bismuth and/or lead film at the wall of the container. The atom then diffuses through the laminar layer and is picked up and moves in the flowing turbulent stream of the hot liquid metal. Manifestly, there will be many atoms of iron caught in the flowing liquid metal stream and as they are moved by their liquid metal carrier into the cooler region of the system, the liquid metal becomes saturated with such iron atoms. As a result, crystal growth and nucleation take place and after a period of time a substantial accumulation of iron crystals takes place in the cold zone. If this cold zone is a heat exchanger tube of the heat transfer system, the tube is ultimately plugged by the iron crystal accumulation.

It has heretofore been proposed to dissolve zirconium in the liquid metal for the purpose of reducing the rate of iron atom transport. However, such an operation does not prevent the buildup of iron crystals in the cold zone but merely retards the rate of accumulation, and in situations where high temperatures are involved and long life desired, the use of zirconium is at best but a stopgap.

The present invention has at its principal object the provision in a closed liquid metal heat transfer system of a particle carrier insoluble in the liquid metal and preferably having a density comparable thereto facilitating its suspension as distinguished from floating or sinking therein and which is capable of serving as a nucleus for atoms of the container material of the system for instance, iron atoms, getting into the liquid metal stream and which will serve to carry such atoms of container material from the hot to the cold and back to the hot portion of the system there to be re-dissolved in the hot liquid metal and which carrier particles will continue to recirculate through the system and pick up further atoms of container material free therein for treatment, all to thereby prevent the buildup of large crystals of atoms of the container material and collection thereof in the cold portion of the system to produce plugging.

A related object is to provide a closed liquid metal heat transfer system in which the liquid metal operates in a container or closure, the walls of which are of ferrous metal and which liquid metal has suspended thereon fine particles of molybdenum powder arranged to circulate in such liquid metal stream to pick up free iron atoms of the container walls getting into the liquid metal stream and moving therewith in such metal stream for inhibiting supersaturation of the liquid system with respect to such iron atoms and thereby preventing plugging of the system.

A specific object of my invention is the use of molybdenum powder in a liquid metal heat transfer system for example employing lead and/or bismuth, for controlling the mass transfer of atoms of the container metal in the system so as to prevent plugging of the latter.

Other objects and advantages of the invention will be evident from the following additional description.

In accordance with my invention I preferably employ finely divided solid particles of molybdenum as the control inhibitor of the liquid metal heat transfer system, for instance one employing lead and/or bismuth and especially low melting binary alloys such as 2½% magnesium and 97½% lead (M.P. 250° C.) as the liquid metal. Molybdenum is highly advantageous and practical for this purpose because it is substantially insoluble in liquid metals such as lead and/or bismuth. Moreover, molybdenum has a density in a relatively closely related range to these metals making it suitable for suspension in these liquid metals. For instance (according to Liquid Metals Handbook, 1952, published by the Atomic Energy Commission and the Department of Navy, pp. 40, 41), the density of bismuth in the temperature range 300–962° C. is between 10.03 and 9.20; that of lead between 400 to 1000° C. is between 10.51 and 9.81, and that of lead-bismuth alloy eutectic between 200–1000° C. is between 10.46 and 9.36 whereas molybdenum has a density of about 10.2. Moreover this metal when employed in fine powder form, preferably as small a particle as can physically be obtained, for instance in the order of one micron diameter, has the unique property of avoiding crystallite growth upon being subject to temperature cycling in the system. More particularly, the molybdenum particles are particularly capable of serving as nuclei in the liquid metal system to prevent its supersaturation by iron atoms of the system container structure.

In actual operation in the system, the molybdenum particles will be used in sufficient concentration so as to be present in both the hot and cold regions of the system. Hence they will be present in the liquid metal reaching the cold zone and will furnish nuclei for the iron atoms of the container material in the cold zone of the system where the solution may become saturated with the dissolved iron but will be prevented from becoming supersaturated therewith by the molybdenum particles. The dissolved iron reaching the cold zone will come out of the solution on these nuclei in preference to accumulating on the wall of the same. With a sufficient number of nuclei operating in the system, the crystals of iron are prevented from growing to large size and will therefore not cause clogging. Moreover, the molybdenum carriers will return the iron crystals to the hot zone of the system where the iron will again be dissolved into the liquid metal stream and the cycle will be repeated. A further advantage of the molybdenum powder carriers is that in serving as nuclei for the dissolved iron and preventing large crystal accumulations thereof, they tend to slow up any sintering action tending to take place in the cold zone of the system wherever accumulation of crystals in contact with each other occurs.

A further advantage of the molybdenum particles in the system described is its minimum effect nuclear wise on a nuclear reactor system. Thus the molybdenum particles are believed to have a minimum effect on a nuclear reactor system from the standpoint of thermal neutron capture. In order to minimize this effect where the molybdenum particles are employed in connection with a nuclear reactor system, optimum results will be obtained by employing a concentration of the molybdenum within the range which the reactor system can tolerate with minimum adverse effect from the above standpoint. It is difficult to predict the exact concentration of molybdenum atoms which may be tolerated in any particular nuclear reactor system, but in general it is believed that a concentration of about five atoms of molybdenum per million atoms of lead and/or bismuth will provide satisfactory results. It may be pointed out that for a given molybdenum atom to liquid metal atom ratio the concentration of the molybdenum nuclei in the system varies inversely as the cube of the diameter of the molybdenum nucleus particle size. Where the molybdenum particles are to be used in a non-nuclear reactor system the concentration of the particles may be materially increased to the limit of a pumpable slurry.

From the foregoing description of my invention it will be apparent that I have described a novel process for controlling the mass transfer of iron crystals to the cold zone of a liquid metal heat transfer system and have provided a unique material to serve as a carrier for such iron particles in such a system. It will be understood that various modifications and substitutions for example in the specific substance used in the liquid metal system may be made and will be obvious to those skilled in the art to which this invention appertains and without departing from the spirit and letter of my invention. All such modifications as may come within the scope of the foregoing description and the appended claims are therefore included.

I claim:

1. A liquid metal composition for use in a liquid metal heat transfer system including metallic container means providing a relatively hot zone and a relatively cooler zone between which the composition is to be recirculated, said composition consisting essentially of liquid metal mass and particles of molybdenum in suspension in said liquid metal mass and substantially non-reactive with and insoluble in said liquid metal mass, said molybdenum particles being present in said liquid metal mass in amount at least about five atoms thereof per million atoms of liquid metal, and said particles being operable for inhibiting the mass transfer of atoms of container material to said cooler zone for accumulation therein.

2. A liquid metal composition for use in a liquid metal heat transfer system including metallic container means providing a relatively hot zone and a relatively cooler zone between which the composition is to be recirculated, said composition consisting essentially of a liquid metal mass and of mass transfer inhibiting particles of molybdenum in suspension in said liquid metal mass and substantially non-reactive with and insoluble in said liquid metal mass, said liquid metal mass consisting essentially of metal from the group consisting of lead, bismuth, lead bismuth alloy, and lead magnesium alloy and the concentration of said molybdenum particles in said liquid metal mass being in amount at least about five atoms thereof per million atoms of liquid metal and sufficient to prevent supersaturation of the system by atoms of the container metal.

3. The composition as claimed in claim 1, wherein said liquid metal mass consists essentially of a combination of lead and magnesium.

4. The composition as claimed in claim 1, wherein said liquid metal mass consists essentially of a combination of lead and bismuth.

5. In a liquid metal heat transfer system including metallic container means providing a relatively hot zone and a relatively cooler zone between which a liquid metal mass is to be recirculated; the process of inhibiting the mass transfer of atoms of container metal to said relatively cooler zone of the system comprising circulating in said system in suspension with said liquid metal mass finely divided particles of molybdenum substantially non-reactive with and insoluble in said liquid metal mass and in amount sufficient to be present in both said hot and cooler zones of said system.

6. In a closed heat transfer system employing a liquid metal circulating material and a ferrous metal structure having a relatively hot zone and a relatively cooler zone between which said liquid metal is recirculated; the process of inhibiting mass transfer of atoms of ferrous material of said structure, comprising circulating in said system in suspension with said liquid metal finely divided particles of molybdenum which are substantially insoluble in and substantially non-reactive with said liquid metal and in amount sufficient to be present in both said hot and cooler zones of said system whereby to prevent supersaturation of the system by said atoms of ferrous material.

7. In a liquid metal heat transfer system including metallic container means providing a relatively hot zone and a relatively cooler zone between which a liquid metal mass is to be recirculated and wherein the liquid metal mass consists essentially of metal selected from the group consisting of lead, bismuth, lead bismuth alloy, and lead magnesium alloy, the process of inhibiting the mass transfer of atoms of container metal to said relatively cooler zone of the system comprising circulating in said system in suspension with said liquid metal mass finely divided particles of molybdenum substantially non-reactive with and insoluble in said liquid metal mass and in amount sufficient to be present in both said hot and cooler zones of said system.

8. The process as claimed in claim 5, wherein said liquid metal mass consists essentially of a combination of lead and magnesium.

9. The process as claimed in claim 5 wherein said liquid metal mass consists essentially of a combination of lead and bismuth.

10. A liquid metal suspension for a liquid metal heat transfer system wherein the liquid metal is recirculated between a relatively hot zone and a relatively cooler zone, consisting essentially of bismuth, and mass transfer inhibiting particles consisting essentially of finely divided particles of molybdenum, in suspension therein and in amount at least above five atoms thereof per million atoms of liquid metal.

11. A composition for a liquid metal heat transfer system wherein the liquid metal is recirculated between a relatively hot zone and a relatively cooler zone consisting essentially of lead and mass transfer inhibiting particles consisting essentially of finely divided particles of molybdenum, in suspension therein and in amount at least about five atoms thereof per million atoms of liquid metal.

12. In a liquid metal heat transfer system wherein liquid metal consisting essentially of at least one liquid metal from the group consisting of lead and bismuth is recirculated in a metallic casing between a relatively hot zone and a relatively cooler zone, the process of inhibiting the mass transfer of atoms of casing material to the said cooler zone of said system comprising circulating in suspension with said liquid metal finely divided particles of molybdenum having a diameter of about one micron and less and in amount sufficient to be present in both said hot and cooler zones of said system.

13. In a liquid metal heat transfer system wherein liquid metal consisting essentially of bismuth is recirculated in a metallic casing between a relatively hot zone and a relatively cooler zone, the process of inhibiting the mass transfer of atoms of casing material to said cooler zone of the system comprising circulating in suspension with said liquid metal finely divided solid particles of molybdenum in amount sufficient to be present in both said hot and cooler zones of said system.

14. In a liquid metal heat transfer system wherein a liquid metal consisting essentially of lead is recirculated in a metal casing bebtween a relatively hot zone and a relatively cooler zone, the process of inhibiting the mass transfer of atoms of casing material to said cooler zone of said system comprising circulating in suspension in said liquid metal finely divided solid particles of molybdenum in amount sufficient to be present in both said hot and cooler zones of said system.

References Cited in the file of this patent

UNITED STATES PATENTS

| | | |
|---|---|---|
| 2,840,467 | Atherton et al. | June 24, 1958 |
| 2,883,330 | Teitel | Apr. 21, 1959 |
| 2,910,417 | Teitel | Oct. 27, 1959 |

OTHER REFERENCES

Nucleonics, vol. 12 (July 1954), pages 14, 15.

Proceedings of the International Conference on the Peaceful Uses of Atomic Energy, Aug. 8–20, 1955, United Nations, New York; vol. 3, pages 128, 131.